US006804313B2

(12) United States Patent
Skafidas et al.

(10) Patent No.: US 6,804,313 B2
(45) Date of Patent: Oct. 12, 2004

(54) APPROACH FOR PROCESSING DATA RECEIVED FROM A COMMUNICATIONS CHANNEL

(75) Inventors: Efstratios Skafidas, Victoria (AU); Shane Michael Tonissen, Victoria (AU)

(73) Assignee: Bandspeed, Inc., Austin, TX (US)

(*) Notice: Subject to any disclaimer, the term of this patent is extended or adjusted under 35 U.S.C. 154(b) by 524 days.

(21) Appl. No.: 09/754,008

(22) Filed: Jan. 2, 2001

(65) Prior Publication Data

US 2001/0036228 A1 Nov. 1, 2001

Related U.S. Application Data

(60) Provisional application No. 60/173,785, filed on Dec. 30, 1999, and provisional application No. 60/173,778, filed on Dec. 30, 1999.

(51) Int. Cl.[7] .............................................. H04B 1/10
(52) U.S. Cl. .................. 375/350; 708/320; 375/285; 375/232
(58) Field of Search .......................... 375/232, 229, 375/233, 234, 285, 346, 350; 708/300, 320, 322, 323

(56) References Cited

U.S. PATENT DOCUMENTS

| | | | | |
|---|---|---|---|---|
| 4,179,696 A | * | 12/1979 | Quesinberry et al. | 342/75 |
| 5,068,873 A | | 11/1991 | Murakami | 375/13 |
| 5,111,481 A | | 5/1992 | Chen et al. | 375/14 |
| 5,432,816 A | | 7/1995 | Gozzo | 375/232 |
| 5,432,821 A | | 7/1995 | Polydoros et al. | 375/340 |
| 5,715,280 A | | 2/1998 | Sandberg et al. | 375/260 |
| 5,926,455 A | * | 7/1999 | Allpress | 370/210 |
| 6,295,326 B1 | | 9/2001 | Tonissen et al. | 375/350 |
| 2002/0001355 A1 | * | 1/2002 | Tore | 375/350 |

FOREIGN PATENT DOCUMENTS

| | | |
|---|---|---|
| EP | 0 795 985 A2 | 9/1997 |
| EP | 0 912 023 A1 | 4/1999 |
| EP | 1 043 875 A2 | 10/2000 |
| WO | WO 97/40587 | 10/1997 |
| WO | WO 98/59450 | 12/1998 |
| WO | WO 00/54472 | 9/2000 |

OTHER PUBLICATIONS

Van Bladel, Mark and Moeneclaey, Marc, "Time–domain Equalization for Multicarrier Communication," IEEE Global Telecommunications Conference, Nov. 14, 1995, pp. 167–171.

Lashkarian, Navid and Kiaei, Sayfe, "Fast Algorithm for Finite–Length MMSE Equalizers with Application to Discrete Multitone Systems," IEEE International Conference on Acoustics, Speech, and Signal Processing, Mar. 15, 1999, pp. 2753–2756.

Bellanger, M. G., "Adaptive Digital Filters and Signal Analysis", 1987, XP002169514, pp. 4–12 and 179–183.

(List continued on next page.)

*Primary Examiner*—Jean B. Corrielus
(74) *Attorney, Agent, or Firm*—Hickman Palermo Truong & Becker LLP; Edward A. Becker (57) ABSTRACT

An approach for processing data received from a communications channel generally involves equalizing received data in the time domain prior to demodulation by an approach that incorporates mitigation of interference. Oversampling of the received signal provides improved equalization performance and mitigation of interference, such as crosstalk. A receiver oversamples a received signal and splits the signal into a set of observation sequences. The set of observation sequences are processed to provide an estimate of the input to the communications channel, while providing at least partial rejection of any interfering signal. Exact knowledge of the parameters of the interference signal is not required.

18 Claims, 4 Drawing Sheets

OTHER PUBLICATIONS

Dalle Mese, et al., "Fixed–Lag Smoother for Digital Channel Equalisation", Electronic Letters, IEE Stevenage, vol. 13, No. 12, Jun. 9, 1977, p. 366–367, XP0000761143, ISSN: 0013–5194.

Chen, W. Y., "DSL: Simulation Techniques and Standards Development for Digital Subscriber Line Systems", 1988, XP002169513, pp. 8, 9, 11, 149–159.

Melsa, P., et al., "Impulse Response Shortening for Discrete Multitone Transceivers", IEEE Transactions on Communications, vol. 44, No. 12, Dec. 1996.

Al–Dhahir, N., et al., "Optimum Finite–Length Equalization for Multicarrier Transceivers", IEEE Transactions on Communications, vol. 44, No. 1, Jan. 1996.

Chow, J., et al., "A Discrete Multitone Transceiver System for HDL Applications", IEEE Journal on Selected Areas in Communications, vol. 9, No. 6, Aug. 1991.

* cited by examiner

APPROACH FOR PROCESSING DATA RECEIVED FROM A COMMUNICATIONS CHANNEL

RELATED APPLICATIONS

This application claims priority from U.S. Provisional Patent Application No. 60/173,785, entitled "METHOD AND APPARATUS FOR EQUALIZATION AND CROSSTALK MITIGATION IN A COMMUNICATION SYSTEM," filed Dec. 30, 1999 by Efstratios Skafidas and Shane Michael Tonissen, and U.S. Provisional Patent Application No. 60/173,778, entitled "METHOD AND APPARATUS FOR EQUALIZATION IN A COMMUNICATIONS RECEIVER USING FINITE PRECISION ARITHMETIC," filed Dec. 30, 1999 by A. Storm, Shane Michael Tonissen and Efstratios Skafidas, the contents of both which are incorporated herein by reference in their entirety for all purposes. This application is related to copending U.S. patent application Ser. No. 09/516,715, now U.S. Pat. No. 6,295,326 entitled "KALMAN FILTER BASED EQUALIZATION FOR DIGITAL MULTICARRIER COMMUNICATIONS SYSTEMS," filed Mar. 1, 2000, by Shane Michael Tonissen, Efstratios Skafidas and Andrew Logothetis.

FIELD OF THE INVENTION

The present invention relates generally to digital communications systems, and more specifically, to an approach for processing data received from a communications channel to equalize and remove distortion and noise from the data.

BACKGROUND OF THE INVENTION

There is a continuing need for higher performance digital data communications systems. Perhaps no where is this need more evident than on the worldwide packet data communications network now commonly referred to as the "Internet." On the Internet, the "richness" of content is constantly increasing, requiring an ever increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

For several reasons, significant efforts are being made to utilize conventional twisted pair telephone lines to provide high-speed digital data transmission. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as ADSL, G.Lite and VDSL, have been developed for providing high-speed digital transmission over conventional twisted pair telephone lines.

Despite the advantages to using conventional twisted pair telephone lines to provide high-speed digital communications, there are some problems with this approach. First, conventional twisted pair telephone lines cause signal attenuation per unit length that increases rapidly with frequency. A moderate length twisted pair line, for example around fifteen thousand feet, may cause only a few decibels (dB) of attenuation in the voice band, for which the line was originally designed, but many tens of dB of attenuation at higher transmission frequencies, for example around 1.1 MHz for ADSL. This results in a transfer function with a wide dynamic range, making channel equalization more difficult. The transfer function is further complicated by bridge taps and impedance mismatches between line sections that cause reflections and echoes at the receiver. Furthermore, the complexity of the transfer function is also increased by filtering performed at the transmitter and receiver.

The standards for ADSL and G.Lite specify Discrete Multitone (DMT) modulation. DMT is also under consideration for use in VDSL systems. DMT modulation generally involves transmitting digital data on a number of carriers simultaneously. Modulation and demodulation are performed using a Fast Fourier Transform (FFT). A cyclic prefix is introduced to ensure separation between successive DMT symbols and eliminate inter-symbol interference (ISI). In practice, the cyclic prefix is necessarily quite short, generally much shorter than the impulse response of the communications channel. This often results in significant ISI being present in the received data. Large amounts of ISI cause a large reduction in the available communications bandwidth.

Standard equalizers used in digital communication systems, such as adaptive LMS and RLS equalizers, are generally inappropriate for DMT systems since they are not designed to eliminate ISI. The current state of the art in equalizer design has the objective of shortening the overall channel plus equalizer impulse response so that the overall response is shorter than the cyclic prefix length. Various attempts to meet this requirement have been made. See for example, *Optimal Finite-Length Equalization for Multicarrier Transceivers*, by N. Al-Dhahir and J. M. Cioffi, IEEE Transactions on Communications, pages 56–63, January 1996; and *A Multicarrier Primer*, by J. M. Cioffi. Determining equalizer coefficients is generally a computationally inefficient process and can be quite sensitive to noise, which limits the practical application of these techniques.

In addition to the equalization problem, twisted pair lines suffer from various forms of interference. Up to fifty twisted pairs are conventionally grouped together in binders. As a result, a signal on one pair can cause interference on other pairs in the same binder. This interference is called crosstalk and results in a reduced signal-to-noise ratio (SNR) at the receiver. Current approaches to mitigate crosstalk require access to the signal transmitted on the interfering line. This makes current approaches useful only in a central office environment, where the signals on all pairs in a binder are available. Thus, none of the existing crosstalk mitigation approaches are suitable when only the received signal is available.

Based on the foregoing, there is a need for an approach for processing data received from a communications channel that does not suffer from the limitations of conventional approaches. There is a particular need for an approach for processing data received from a communications channel that provides communications channel equalization and interference mitigation.

SUMMARY OF THE INVENTION

According to another aspect of the invention, a method is provided for processing data received from a communications channel. According to the method, received data is received from the communications channel, wherein the received data is based upon both modulated data and distortion introduced by the communications channel, wherein the modulated data is the result of original data modulated onto one or more carriers. The method also includes generating sampled data by sampling the received data at a specified rate that satisfies specified sampling criteria, generating a filtered observation sequence by processing the sampled data and generating estimated modulated data by processing the filtered observation sequence using a recursive filter. Finally, an estimate of the original data is recovered by demodulating the estimated modulated data.

According to another aspect of the invention, an apparatus is provided for processing data received from a communications channel. The apparatus includes an analog-to-digital converter configured to generate sampled data by sampling, at a specified rate that satisfies specified sampling criteria, received data received from the communications channel, wherein the received data is based upon both modulated data and distortion introduced by the communications channel, and wherein the modulated data is the result of original data modulated onto one or more carriers. The apparatus also includes a first filter mechanism configured to generate a filtered observation sequence by processing the sampled data and a second filter mechanism configured to generate estimated modulated data by processing the filtered observation sequence. The apparatus also includes a demodulator configured to recover an estimate of the original data by demodulating the estimated modulated data. The apparatus may also include an impulse response shortening filter before the demodulator, depending upon the requirements of a particular application.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of the approach described herein for processing data received from a communications channel are described in more detail in the following sections: (1) overview; (2) FIR filtering; (3) FIR filter coefficient estimation; (4) recursive filtering; (5) recursive filter coefficient estimation; (6) covariance estimation; (7) recursive filter gain estimation; (8) equalizer training; and (9) implementation mechanisms.

1. Overview

An approach for processing data received from a communications channel generally involves equalizing received data in the time domain prior to demodulation by an approach that incorporates mitigation of interference. Oversampling of the received signal and the use of finite impulse response (FIR) and recursive filters provides improved equalization performance and mitigation of interference, such as crosstalk.

Figure 1:
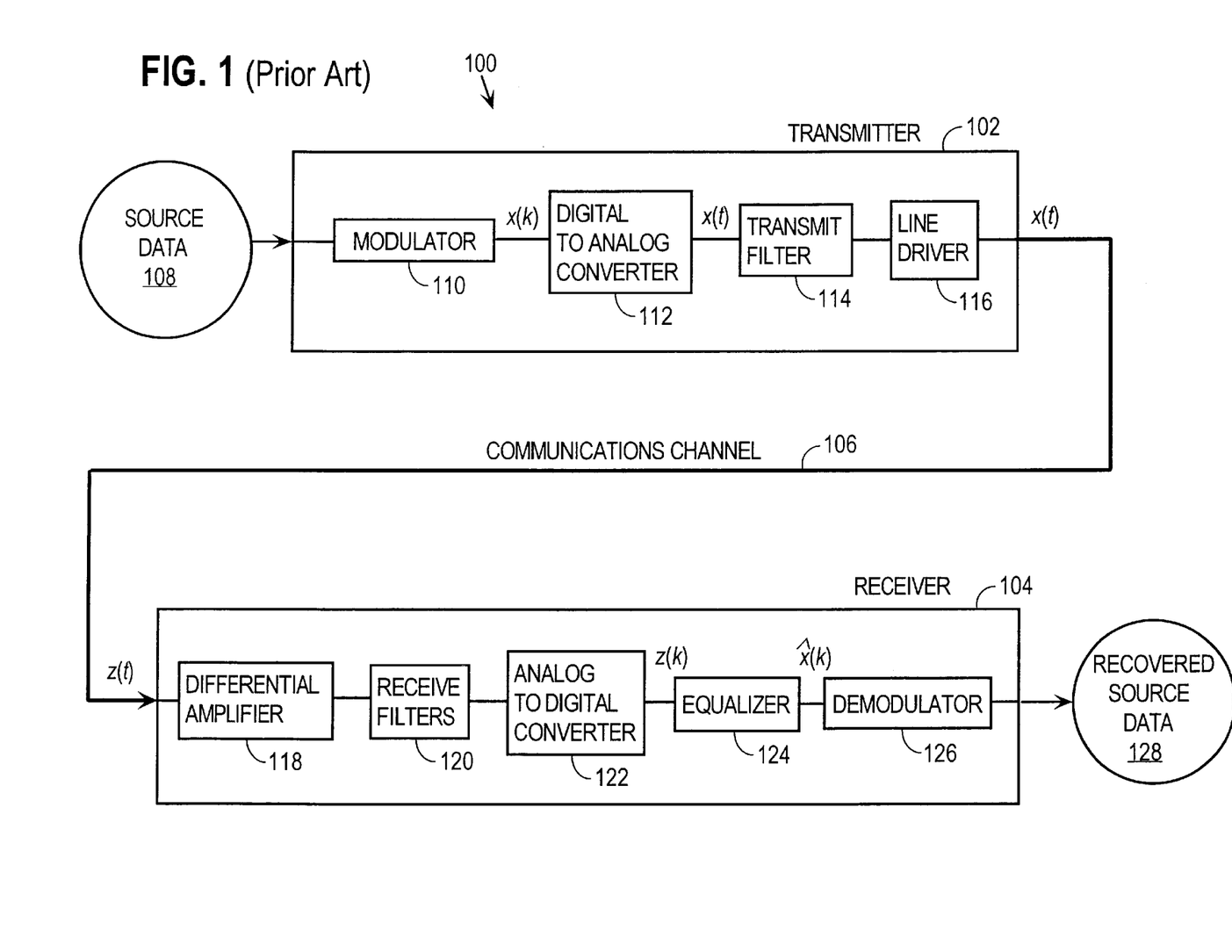
FIG. 1 is a block diagram of a conventional digital data communications arrangement.

FIG. 1 is a block diagram of a conventional communications system arrangement 100. Arrangement 100 includes a transmitter 102 communicatively coupled to a receiver 104 via a communications channel 106. Communications channel 106 may be any type of medium or mechanism for providing data from transmitter 102 to receiver 104. For purposes of explanation only, various embodiments of the invention are described herein in the context of communications channel 106 as a land line, such as one or more conventional twisted pair telephone lines.

Transmitter 102 receives digital source data 108, e.g., a digital stream, that is modulated by a modulator 110 to generate a sampled data signal x(k), where k is the sample number, and the sampling rate is given by $F_S$. The sampled data signal x(k) is converted to an analog signal x(t) by an digital to analog converter 112. The analog signal x(t) is processed by a transmit filter 114 to remove unwanted components from the analog signal x(t). The analog signal x(t) is then amplified by a line driver 116 and transmitted onto communications channel 106. It should be noted that the transmitted analog signal x(t) is not strictly a continuous time representation of the sampled data signal x(k) since transmit filter 114 modifies the signal, but is represented as such herein for the purposes of explanation. The transmitted analog signal x(t) passes through communications channel 106, which has an impulse response of h(t) and corresponding transfer function H(f). The output of communications channel 106 y(t) is the convolution of analog signal x(t) and the channel impulse response h(t), given by $$y(t)=x(t)*h(t) \qquad (1)$$

The signal received by receiver 104 z(t) is the sum of the output of communications channel 106 y(t) and an additive noise signal n(t), given by $$z(t)=y(t)+n(t) \qquad (2)$$

where the additive noise signal n(t) consists of any form of interference introduced by communications channel 106, for example crosstalk, and an additive white Gaussian noise component.

A differential amplifier 118 processes the received signal z(t) to generate an amplified signal z(t). The amplified signal z(t) is then processed by one or more receive filters 120 to remove undesired components and generate a filtered signal z(t). The filtered signal z(t) is sampled by analog-to-digital converter 122 to generate a digital signal z(k) which at this point is still modulated. It should be pointed out that z(k) is not strictly a sampled version of z(t) due to the processing of receive filters 120 which modify the signal, but is represented as such herein for the purposes of explanation.

An equalizer 124 processes digital signal z(k) in the time domain to remove ISI and recover the transmitted modulated data $\hat{x}(k)$. A demodulator 126 processes the modulated data $\hat{x}(k)$, e.g., via an FFT and possibly a frequency domain equalizer, to generate recovered source data 128, which ideally very closely approximates source data 108.

Figure 2:
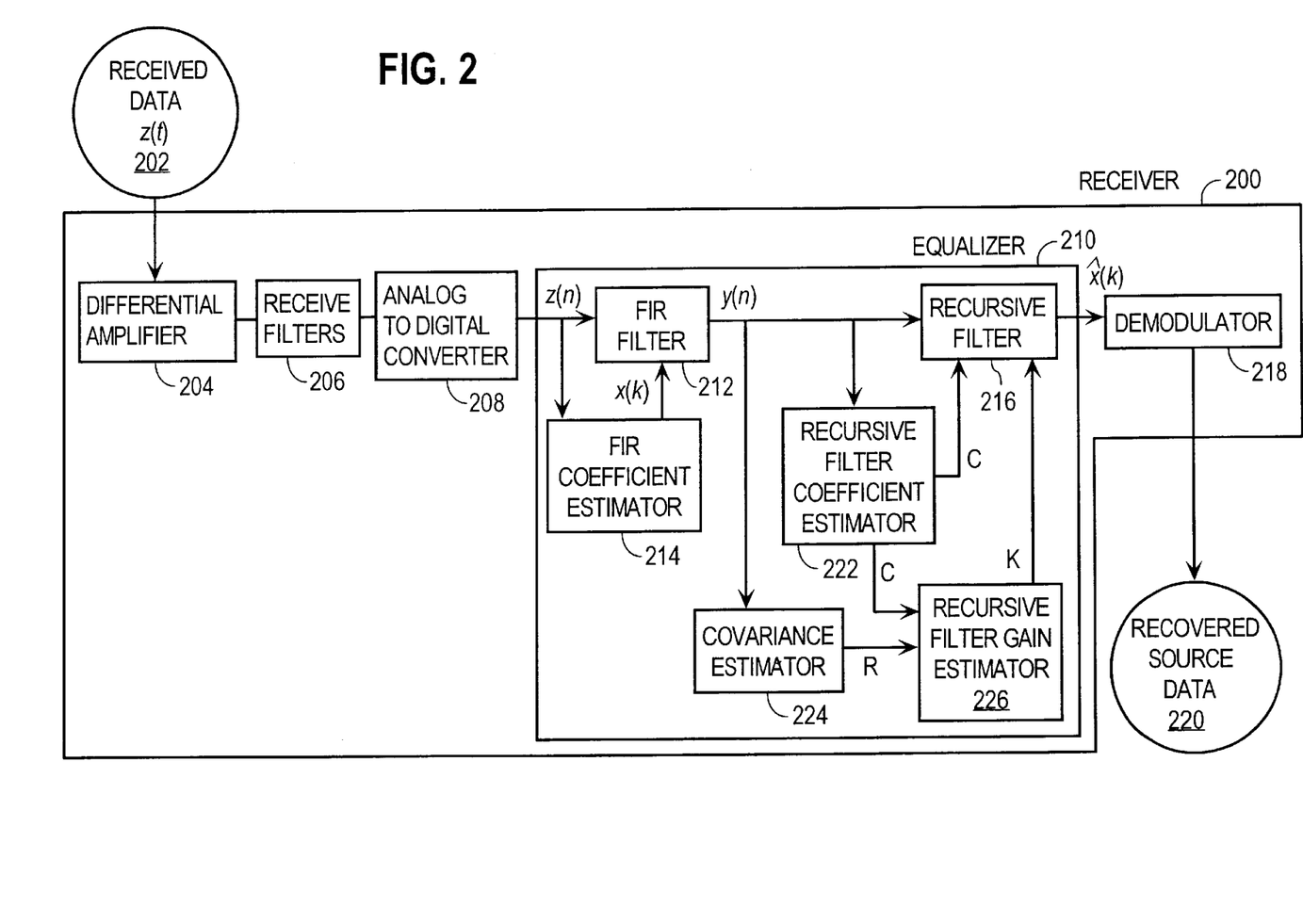
FIG. 2 is a block diagram of an arrangement for processing data received from a communications channel according to an embodiment of the invention.

FIG. 2 is a block diagram of a receiver 200 for processing received data z(t) 202 from communications channel 106 according to an embodiment of the invention. As with the conventional arrangement 100 of FIG. 1, received data z(t) 202, obtained from communications channel 106, is the sum of the output of communications channel 106 y(t) and an additive noise signal n(t). The received data z(t) 202 is processed by a differential amplifier 204, one or more receive filters 206 and an analog-to-digital converter 208. According to one embodiment of the invention, analog-to-digital converter 208 samples the output of receive filters 206 at a rate $N_{OS}F_S$, where $F_S$ is the sampling rate at the transmitter, and $N_{OS}$ is an arbitrary integer oversampling factor greater than or equal to two, i.e., $N_{OS} \geq 2$. The oversampled signal z(n), where n is the sample number, is generated by analog-to-digital converter 208 and provided to an equalizer 210.

Within equalizer 210, the oversampled signal z(n) is processed by a finite impulse response (FIR) filter 212, which generates a filtered observation sequence y(n). An FIR coefficient estimator 214 determines the coefficients required by FIR filter 212. According to one embodiment of the invention, the coefficients for FIR filter 212 are selected such that the length of the overall impulse response of communications channel 106 and FIR filter 212 is minimized. Any appropriate technique can be used to perform the coefficient estimation/selection and the invention is not limited to any particular approach. According to one embodiment of the invention, the FIR coefficients are obtained during receiver initialization, where a known training sequence is used to train receiver 200. The total number of coefficients in FIR filter 212 is denoted by $N_{FIR}$.

After being processed by FIR filter 212, the filtered observation sequence y(n) is formed into an observation vector consisting of the last $N_{OS}$ samples and the previous (M−1) $N_{OS}$ samples, for a total observation vector length of M $N_{OS}$ samples. The observation vector is provided to a recursive filter 216, which filters the observation vector and provides an estimate, denoted $\hat{x}(k)$, of the sampled communications channel 106 input signal (e.g., x(k) in FIG. 1). The estimate of the sampled communications channel 106 input signal $\hat{x}(k)$ is provided to a demodulator 218 that recovers an estimate of the original source data 108 in the form of recovered source data 220.

Figure 3:
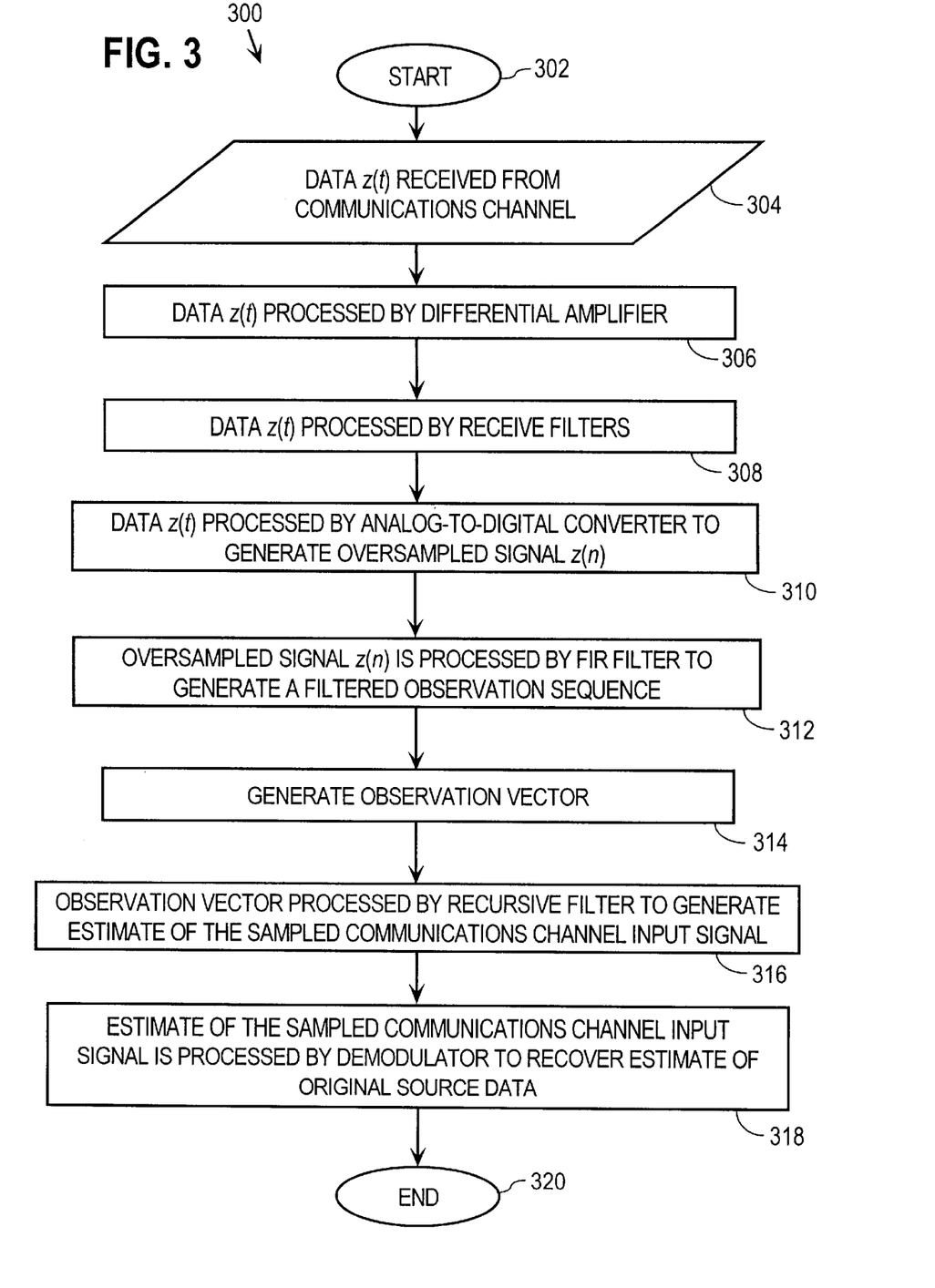
FIG. 3 is a flow diagram of an approach for processing data received from a communications channel according to an embodiment of the invention.

FIG. 3 is a flow diagram 300 that illustrates an approach for processing data received from a communications channel according to an embodiment of the invention. After starting in step 302, in step 304, received data z(t) is received from communications channel 106. In step 306, the received data z(t) is processed by differential amplifier 204 to generate amplified data z(t). In step 308, the amplified data is processed by the one or more receive filters 206 to generate filtered data z(t).

In step 310, the filtered data z(t) is sampled by analog-to-digital converter 208 to generate an oversampled signal z(n). In step 312, the oversampled signal z(n) is processed by FIR filter 212, which generates a filtered observation sequence y(n). As previously described herein, FIR coefficient estimator 214 determines the coefficients required by FIR filter 212.

In step 314, the filtered observation sequence y(n) is formed into an observation vector of M $N_{OS}$ samples. In step 316, the observation vector is provided to a recursive filter 216, which filters the observation vector and provides an estimate $\hat{x}(k)$ of the sampled communications channel 106 input signal (e.g., x(k) in FIG. 1). In step 318, the estimate of the sampled communications channel 106 input signal $\hat{x}(k)$ is provided to a demodulator 218 that recovers an estimate of the original source data 108 in the form of recovered source data 220. The process is complete in step 320.

According to one embodiment of the invention, recursive filter 216 is in a form that at least approximates a steady state Kalman filter, and therefore requires coefficients and a steady state gain matrix. Although embodiments of the invention are described herein in the context of using a Kalman filter for recursive filter 216, other estimators may be used instead, such as a least squares estimator. According to this embodiment, both the coefficients and steady state gain matrix are obtained during initialization of receiver 200, where a known training sequence is used to train receiver 200. The state estimate vector $\hat{x}(k)$ is extended by $N_S$ elements, where $N_S$ denotes the number of smoothing steps used in the recursive filter. The extension of the state estimate in this manner enables a smoothed estimate of the state to be obtained, which reduces the estimation error. The smoothing steps are introduced with a small increase in computational and memory requirements, primarily during the training stages.

A recursive filter coefficient estimator 222 determines the coefficients required by recursive filter 216. These coefficients consist of the samples of the residual impulse response after FIR filter 212. The coefficients for recursive filter 216 are determined after the FIR coefficients have been determined, and FIR filter 212 is operational. According to one embodiment of the invention, the coefficients for recursive filter 216 are then estimated using the known training symbols to estimate the transfer function for communications channel 106 in the frequency domain, and using the inverse FFT to obtain an estimate of the residual impulse response. Selecting the FIR coefficients appropriately provides a residual response that is approximately finite length, with at most $N_{OS}$ $N_H$ samples, where $N_H$ is the number of samples of the overall impulse response at the non-oversampled sampling frequency $F_S$.

A covariance estimator 224 computes an estimate of the noise covariance matrix, which is required by a recursive filter gain estimator 226. According to one embodiment of the invention, the noise covariance matrix is estimated during a part of the initialization of receiver 200 when it is known there is no data transmission, so the received signal consists only of the distortion introduced into communications channel 106, i.e., n(t). Any appropriate method for estimation of a covariance method can then be used, with the FFT providing an efficient means for computing the required elements using frequency domain methods.

Estimating the recursive filter gain generally involves estimating the steady state Kalman gain matrix, and requires the recursive filter coefficients from recursive filter coefficient estimator 222 and the noise covariance matrix estimate. According to one embodiment of the invention, the steady state gain matrix is computed by first computing the steady state estimation error covariance matrix, obtained by solving the appropriate matrix Riccati equation. There are various approaches for solving this equation, such as an iterative approach described herein, although any suitable approach may be used. One technique for solving the equation is described in *Tracking and Data Association*, by Y. Bar-Shalom and T. E. Fortmann, Academic Press, 1988. Another technique is a square root filter update approach, which may provide improved numerical stability in certain situations. This technique is described in *Stochastic Models, Estimation, and Control*, Volume 1, by P. S. Maybeck, Academic Press, 1979.

2. FIR Filtering

FIR filter 212 filters the sampled signal z(n) and generates a filtered signal y(n), such that $$y(n) = \sum_{i=0}^{N_{FIR}-1} a(i)z(n-i) \qquad (3)$$

where $\{a(i), i=0, \ldots, N_{FIR}-1\}$ is the set of FIR filter coefficients, determined in the manner described hereinafter. The FIR filter equation (3) is the standard form of an FIR filter. See for example, *Digital Signal Processing*, by A. V. Oppenheim and R. W. Schafer, Prentice-Hall International, 1975. As used herein, the FIR component has the effect of shortening the length of the overall communications channel 106 impulse response. Since the coefficients used in the recursive filter component are the samples of the impulse response, it is desirable that this impulse response is as short as possible.

3. FIR Filter Coefficient Estimation

FIR coefficient estimator 214 estimates a set of FIR coefficients, denoted by $\{a(i):i=0 \ldots N_{FIR}-1\}$, for use in FIR filter 212. According to one embodiment of the invention, the estimated coefficients have the property that the combination of transmit filter, communications channel 106, receive filters 206 and FIR filter 212 yield an overall impulse response of minimum duration. There are various known techniques for achieving this result and the invention is not limited to any particular technique. In one such technique, described in *Time Series: Theory and Methods*, by P. J. Brockwell and R. A. Davis, Springer 1998, FIR coefficients are chosen to cancel the poles of the communications channel and filters, leaving a FIR residual. For purposes of explanation, this technique is used herein to describe estimating FIR coefficients, although the invention is not limited to this particular technique. According to this technique, the communications channel and filters are modeled collectively using an auto-regressive moving average (ARMA) model, given by $$H(z) = \frac{b(z)}{a(z)} \qquad (4)$$

$$= \frac{b(0) + b(1)z^{-1} + b(2)z^{-2} + \ldots + b(q)z^{-q}}{1 + a(1)z^{-1} + a(2)z^{-2} + \ldots + a(p)z^{-p}}$$

where H(z) is the z-transform of the digital and analog transmission path from the digital modulator output in the transmitter through to the output of analog-to-digital converter 208 in receiver 200, and a(0)=1 by definition. This includes all digital and analog filtering and communications channel 106. The system is an infinite impulse response (IIR) system, with impulse response given by $\{h(n), n=0, \ldots, \infty\}$. When filtered by FIR filter 212 with coefficients given by $\{a(i), i=0, \ldots, p\}$, the overall response $h_T(n)$ has finite length, given by the system numerator such that $\{h_T(n):h_T(n)=b(n), n=0, \ldots, q\}$.

According to one embodiment of the invention, to implement FIR filter 212, the parameters of the ARMA model representing the system are estimated. Many such techniques are known for estimating the parameters of the ARMA model representing the system and the invention is not limited to any particular technique. An example of a suitable technique is described in *Optimal Filtering*, by B. D. O Anderson and J. B. Moore, Prentice-Hall, 1979.

For the given ARMA model, and an input sequence u(n), the output sequence w(n) is given by $$w(n) = \sum_{i=0}^{q} b(i)u(n-i) - \sum_{j=1}^{p} a(j)w(n-j) \qquad (6)$$

The received signal is then $v(n)=w(n)+\epsilon(n)$, where $\epsilon(n)$ is an additive noise sequence. Given the observation sequence v(n), the objective is to estimate the a and b coefficients. In addition, during the initialization of receiver 200, a known training sequence is transmitted, so the input sequence u(n) is also known. The least squares estimation of the parameters proceeds as follows:

First, the observation matrix G is formed from samples of the input and output sequences, with $$G = \begin{bmatrix} v(s-1) & \cdots & v(s-p) & u(s) & \cdots & u(s-q) \\ v(s) & \cdots & v(s+1-p) & u(s+1) & \cdots & u(s+1-q) \\ \vdots & & \vdots & \vdots & & \vdots \\ v(s+N_v-1) & \cdots & v(s+N_v-p) & u(s+N_v) & \cdots & u(s+N_v-q) \end{bmatrix} \qquad (7)$$

where it is assumed the corresponding samples of the input and output sequences are available, and is some arbitrary index in the output sequence. This condition can always be met by appropriate choice of s and $N_v$. It is observed that in a noise free situation v(n)=w(n), and therefore $$V = G\theta \qquad (8)$$

where $$V = \begin{bmatrix} v(s) \\ v(s+1) \\ \vdots \\ v(s+N_v) \end{bmatrix} \qquad (9)$$

$$\theta = \begin{bmatrix} a(1) \\ \vdots \\ a(p) \\ b(0) \\ \vdots \\ b(q) \end{bmatrix} \quad (10)$$

In the presence of additive noise, the least squares estimate of the parameter vector $\theta$ is given by $$\hat{\theta}_{LS} = \arg\min_{\theta} E\{(V - G\theta)'(V - G\theta)\} \quad (11)$$

$$= (G'G)^{-1}G'V \quad (12)$$

The first p elements of $\hat{\theta}_{LS}$ consist of $\{\hat{a}(i), i=1, \ldots, p\}$, and with $a(1)=1$ by definition, these elements form the estimated FIR filter coefficients to yield an overall impulse response approximately equal to the numerator b. It is assumed that $p \leq N_{FIR}$, and $a(i)=0$ for $p < i \leq N_{FIR}$.

The system orders p and q are generally unknown and practical systems limit the values of p and q to some reasonable upper limits. According to one embodiment of the invention, the values of p and q are fixed at specified values. If the selected orders are too low, the system will be underdetermined, so the estimated model will not correspond exactly to the actual system, and so the overall response $h_T(n)$ may be longer than expected. This may still provide acceptable results, provided the model mismatch is not too great. If the selected orders are too high, the system will be overdetermined, so the matrix G'G will not be of full rank, and the inverse will not exist. In fact, there are an infinite number of acceptable solutions, so a pseudo-inverse provides a robust approach to obtaining one such acceptable solution. Therefore, according to one embodiment of the invention, the model orders are chosen as high as practical, and a pseudo-inverse is used to ensure robustness.

4. Recursive Filtering

The filtered observation sequence, y(n), generated by FIR filter 212, is formed into vectors of length M $N_{OS}$ samples, where $N_{OS}$ is the oversampling factor and $M \geq 1$ is a filter memory parameter. The overall observation vector is denoted by $$Y(k) = \begin{bmatrix} \tilde{Y}(k - M + 1) \\ \tilde{Y}(k - M + 2) \\ \vdots \\ \tilde{Y}(k - 1) \\ \tilde{Y}(k) \end{bmatrix} \quad (13)$$

where $$\tilde{Y}(k) = \begin{bmatrix} y((k-1)N_{OS} + 1) \\ y((k-1)N_{OS} + 2) \\ \vdots \\ y(kN_{OS} - 1) \\ y(kN_{OS}) \end{bmatrix} \quad (14)$$

It is noted that Y(k) consists of a vector M $N_{OS}$ samples, ordered such that the oldest sample $y((k-M)N_{OS}+1)$ is the first element of Y(k), and the most recent observation, $y(kN_{OS})$, is the last element of Y(k). Recursive filter 216 generates an estimate of the communications channel 106 input data $\hat{x}(k)$ by forming a state estimate $\hat{X}(k)$ given by $$\hat{X}(k) = A\hat{X}(k-1) + K(Y(k) - CA\hat{X}(k-1)) \quad (15)$$

where $$\hat{X}(k) = \begin{bmatrix} \hat{x}(k) \\ \hat{x}(k-1) \\ \vdots \\ \hat{x}(k - N + 1) \end{bmatrix} \quad (16)$$

is the state estimate vector, consisting of estimates of the communications channel 106 input data at the current sample k, and the past N−1 samples, with initialization X(0)=0. As the delay d increases, the quality of the estimate x(k−d) increases. As a consequence, the estimated communications channel 106 data is taken to be x(k−N+1), resulting in an N−1 sample delay at receiver 200. The choice of N is therefore a tradeoff between the desire for estimation quality and minimum delay. The choice of N is described hereinafter in more detail, but for most practical applications beyond a moderate value of N, the increase in estimation quality becomes negligible, particularly for fixed-point implementations. It should also be noted that X(k) is ordered from most recent element to oldest, the opposite of the ordering of Y(k).

The other matrices in equation (15) are the N×M $N_{OS}$ gain matrix K, the M $N_{OS}$×N observation matrix C and the N×N state transition matrix A, given by $$A = \begin{bmatrix} 0 & 0 & 0 & \cdots & & 0 \\ 1 & 0 & 0 & \cdots & & 0 \\ 0 & 1 & 0 & \cdots & & 0 \\ \vdots & & & \ddots & & \vdots \\ 0 & & & \cdots & 0 & 1 & 0 \end{bmatrix} \quad (17)$$

The state transition matrix A is a shifting matrix which deletes the last element of x(k), shifts the remaining elements down one place, and inserts a zero in the first element. The observation matrix C is determined by the recursive filter coefficient estimator 222. The matrix K is determined by recursive filter gain estimator 226. The estimation of these matrices is described in more detail hereinafter.

5. Recursive Filter Coefficient Estimation

Recursive filter coefficient estimator 222 estimates the filter coefficients that constitute the M $N_{OS}$×N observation matrix C. The elements of matrix C are the sample of the residual impulse response $h_T(n)$, obtained from the combination of communications channel 106 and FIR filter 212. Due to the process by which FIR filter 212 coefficients are determined, the residual response should be of finite duration. It is assumed the duration of $h_T(n)$ is $N_{OS}N_H$ samples, so $h_T(n)=0$ for $n > N_{OS}N_H$, where NH is the number of samples of the residual response if no oversampling is used.

According to one embodiment of the invention, the residual impulse response $h_T(n)$ is estimated after the coefficients for FIR filter 212 have been estimated and FIR filter 212 is operational. During initialization of receiver 200, a sequence of known samples is transmitted to enable training of equalizer 210. For the estimation of $h_T(n)$ it is assumed a sequence is available which repeats every $N_{FFT}$ samples, where $N_{FFT}$ is a power of 2. Such a sequence is available during the receiver initialization sequences for the ADSL, G.Lite and the draft VDSL standards.

The transmitted sequence is denoted by U={u(n), n=0, ..., $N_{FFT}$−1}, while the received sequence is split into blocks denoted by $Y(r)=\{y(n), n=rN_{FFT}, \ldots, (r+1) N_{FFT}-1\}$. If the sequence $u(n)$ is transmitted $N_u$ times, then the residual impulse response may be determined using the FFT, giving $$h_T(n) = \mathcal{F}^{-1}\left(\frac{\mathcal{F}\left(\frac{1}{N_u-1}\sum_{r=1}^{N_u-1} Y(r)\right)}{\mathcal{F}(U)}\right) \quad (18)$$

where $F(.)$ and $F^{-1}(.)$ denote the FFT and its inverse respectively, and $Y(0)$ is not used to avoid edge effects. It should be noted that the impulse response is time shifted, so any leading zeros in $h_T(n)$ are removed. An alternative to the above approach involves taking the average of the FFTs of the received blocks $Y(k)$ instead of taking the FFT of the average of the received blocks. Both approaches are equivalent due to the linear nature of the FFT operation.

The observation matrix C is determined from the (first) $N_{OS}N_H$ samples of $h_T(n)$ as follows. The $N_{OS} \times N_H$ matrix $C_1$ is given by $$C_1 = \begin{bmatrix} h_T(0) & h_T(N_{OS}) & \cdots & h_T(N_{OS}(N_H-1)) \\ h_T(1) & h_T(N_{OS}+1) & \cdots & h_T(N_{OS}(N_H-1)+1) \\ \vdots & \vdots & & \vdots \\ h_T(N_{OS}-1) & h_T(2N_{OS}-1) & \cdots & h_T(N_{OS}N_H-1) \end{bmatrix} \quad (19)$$

where it is assumed $h_T(n)=0$ for $n>N_{OS}N_H$. The $MN_{OS} \times (N_H+M-1)$ matrix $C_2$ is given by $$C_2 = \begin{bmatrix} 0 & \cdots & 0 & 0 & C_1 \\ \vdots & & & & \\ 0 & C_1 & 0 & \cdots & 0 \\ C_1 & 0 & 0 & \cdots & 0 \end{bmatrix} \quad (20)$$

where 0 is an $M \times 1$ zero vector. The $MN_{OS} \times N$ observation matrix C is given by $$C=[C_2 \ 0] \quad (21)$$

where 0 is an $MN_{OS} \times N_S$ zero matrix, and $N_S$ denotes the number of smoothing steps, and therefore $N=N_S+N_H+M-1$. Smoothing steps are introduced to ensure there is sufficient delay in recursive filter coefficient estimator 222 to ensure the accuracy of the state estimates. In practice, due to round off error in fixed-point arithmetic, there will be a moderate value of $N_S$ after which there will be no further improvement in estimation accuracy, so $N_S$ should be chosen to be some reasonable value, depending on available processor resources and the requirements of a particular application.

6. Covariance Estimation

Covariance estimator 224 estimates the $MN_{OS} \times MN_{OS}$ covariance matrix, denoted R, of the noise at the output of FIR filter 212. According to one embodiment of the invention, the noise covariance R is estimated during the receiver 200 training sequence when there is no transmitter signal present at the receiver 200 input and after FIR filter 212 has been trained. Alternatively, the noise covariance matrix may be estimated at the input of receiver 200 without FIR filter 212 and the resultant noise covariance at the filter estimated once FIR filter 212 is trained. This may result in additional error in the covariance estimate due to neglecting any error introduced by FIR filter 212.

The noise covariance matrix is defined as $$R=E\{(N(k)-\overline{N})(N(k)-\overline{N})'\} \quad (22)$$

where $N(k)$ is a vector of $MN_{OS}$ noise samples observed at the receiver input, and $\overline{N}=0$ when there is no DC component in the received signal. It is also observed that $Y(k) \equiv N(k)$ when there is no transmitted signal. Hence, with the observation vectors defined as in (13), the noise covariance matrix can be estimated by averaging over $N_R$ observation vectors, giving $$\hat{R} = \frac{1}{N_R}\sum_{k=0}^{N_R-1} Y(k)T(k)' \quad (23)$$

where $Y(k)$ is the observation vector at the output of FIR filter 212 as defined in (13), when it is known there is no transmitted signal component in the received signal, so $Y(k)=N(k)$.

The form of the observation vector is essential to ensure any cyclostationary characteristics of the noise are manifested in the covariance matrix. In the presence of cyclostationary interference, the equalizer 210 is capable of rejecting the interference and thereby increasing the SNR. This increased SNR provides either additional data capacity or extended reach capability. One source of cyclostationary interference is likely to be crosstalk from other bearers carrying similar digital transmissions.

The method described in (23) is an example approach for estimating R. Other suitable technique may be used and the invention is not limited to any particular approach. In addition, sub-optimal solutions may be achieved by approximating the covariance matrix. For example, a sub-optimal solution may be obtained by estimating the received noise variance and using a diagonal R matrix with the diagonal elements set equal to the noise variance. Alternatively, the estimation of R could be avoided altogether by using a fixed value of R in all cases. These sub-optimal alternatives may still yield acceptable equalizer performance. However some degradation may be expected compared to when the noise covariance matrix R is estimated correctly.

7. Recursive Filter Gain Estimation

Recursive filter gain estimator 226 estimates the $N \times MN_{OS}$ gain matrix K used in equation (15). The estimated gain matrix K is the steady state Kalman filter gain matrix computed from the system matrices, so the covariance and filter coefficient estimation must both be complete prior to steady state gain computation. The covariance propagation equations described herein may be derived from the *Tracking and Data Association* reference, however any equivalent covariance propagation may be used and the invention is not limited to any particular covariance propagation. For example, the square root filter equations described in the *Stochastic Models, Estimation, and Control* reference may be used to provide numerical stability when implemented on a fixed-point processor platform.

Computation of the steady state gain K commences by initializing the estimation error covariance matrix $P(0|0)$ to some large initial value so $P(0|0)$ is an $N \times N$ diagonal matrix $$P(0|0) = \begin{bmatrix} \sigma_0^2 & 0 & \cdots & 0 \\ 0 & \sigma_0^2 & 0 & \vdots \\ \vdots & 0 & \ddots & 0 \\ 0 & \cdots & 0 & \sigma_0^2 \end{bmatrix} \quad (24)$$

with $\sigma^2_o$ selected as some large initial value. The covariance matrix is then updated according to the following iteration $$P(k|k-1)=AP(k-1|k-1)A'+BQB' \quad (25)$$

$$K=P(k|k-1)C'(CP(k|k-1)C'+R)^{-1} \quad (26)$$

$$P(k|k)=(I-KC)P(k|k-1)(I-KC)+KRK' \quad (27)$$

where Q is the assumed process noise variance of the driving process (the transmitted data sequence) and is an arbitrary constant. Q is chosen with consideration to the processor scaling requirements. A, C, and R are as defined in previous sections, and B is given by $$B = \begin{bmatrix} 1 \\ 0 \\ \vdots \\ 0 \end{bmatrix} \quad (28)$$

The value of Q represents the variance of the prediction of the first element of the state. Therefore, prior to making a measurement, no a-priori information is available about the prediction of x(k+1). It is therefore desirable to choose Q to be large to reflect the uncertainty in the state prediction and avoid biasing the updated estimate. The value of Q should be chosen as large as possible, with consideration to the dynamic range of the processor to ensure against overflow. Other values of Q may be used, at the expense of possible inferior performance.

The iteration in equations (25) though (27) proceeds until the estimation error covariance matrix P(k|k) has converged to a steady state value P, with convergence determined by some appropriate metric. One such metric is when the difference between the traces of successive P(k|k) matrices is less than some preset threshold. The update equation used in (27) is a form used to ensure that the covariance matrix remains symmetric and positive definite, providing improved numerical stability of the result.

When the covariance matrix has converged, the steady state gain is calculated according to $$K=PC'(CPC'+R)^{-1} \quad (29)$$

The gain matrix need not be chosen to be the steady state Kalman gain matrix as described here. As with the noise covariance estimation, other sub-optimal techniques can be used for gain estimation. Using other gain matrices however, may result in sub-optimal filter performance, causing some SNR degradation.

8. Equalizer Training

Embodiments of the invention are described herein in the context of obtaining the output x(k) given an oversampled input sequence y(n) and the procedure for obtaining the required filter coefficients during the receiver initialization sequence. According to one embodiment of the invention, equalizer 210 is trained as follows:

a. FIR coefficient estimation is performed as described herein using the sampled receiver input sequence z(n) and knowledge of the transmitted training symbols u(n).

b. The FIR coefficients are loaded into FIR filter 212 and FIR filter 212 begins generating output sequence y(n).

c. Recursive filter 216 coefficient matrix C is estimated using the output y(n) of FIR filter 212 and knowledge of the transmitted training symbols u(n).

d. Estimate the noise covariance matrix R during a portion of the initialization procedure where there is not transmitted signal.

e. Computer the gain of recursive filter 216 using the estimated filter coefficient matrix C and the noise covariance matrix R.

f. The estimated filter coefficient matrix C and the noise covariance matrix R are loaded into recursive filter 216 and initialize the filter state to X(0)=0.

g. Take the estimated transmitted data from the last element of the state vector, representing x(k−N+1).

9. Implementation Mechanisms

The approach described in this document for processing data received from a communications channel may be implemented in a receiver, such as receiver 200, or may be implemented into a stand-alone mechanism. The functionality of the elements depicted in FIG. 2 may be implemented separately or in various combinations, depending upon the requirements of a particular application, and the invention is not limited to any particular implementation. Furthermore, the approach described herein for processing data received from communications channel 106 may be implemented in computer software, in hardware circuitry, or as a combination of computer software and hardware circuitry. Accordingly the invention is not limited to a particular implementation.

Figure 4:
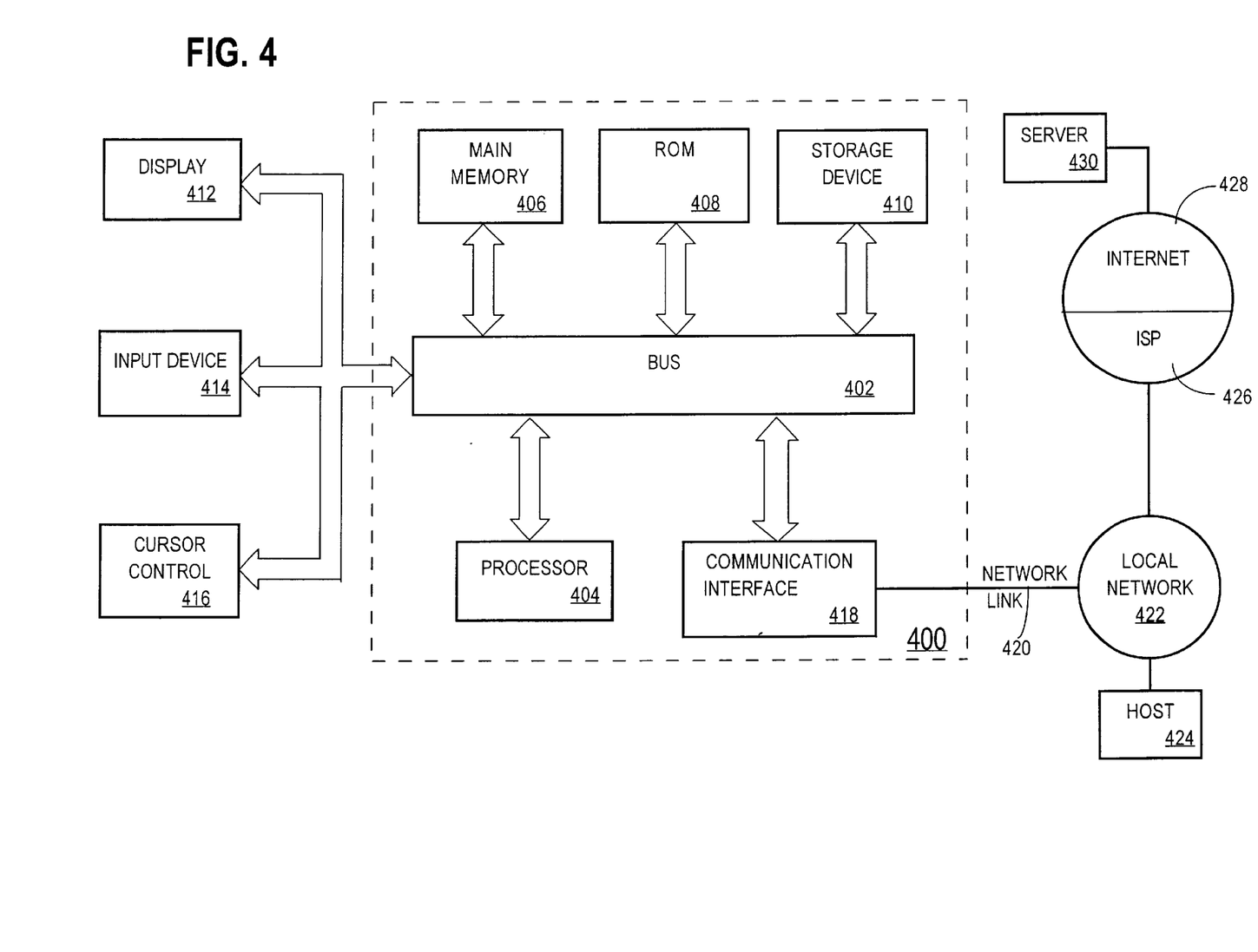
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for processing data received from a communications channel. According to one embodiment of the invention, processing data received from a communications channel is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electro-magnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the processing of data received from a communications channel as described herein.

The received code may be executed by processor 404 as it is received, and/or stored in storage device 410, or other non-volatile storage for later execution. In this manner, computer system 400 may obtain application code in the form of a carrier wave.

The approach described here for processing data received from a communications channel provides significant advantages over prior approaches. Importantly, unlike conventional equalizers that sample the received signal at the baud rate, the approach described herein uses oversampling of the received signal. Oversampling of the received signal provides improved equalization performance to eliminate ISI (particularly for non-minimum phase channels), while enabling some crosstalk mitigation to be achieved. The use of adaptive filtering provides for recovery of the transmitted signal subject to a time delay and also provides for at least partial removal of interference. This substantially reduces or eliminates the need to transmit a cyclic prefix in DMT systems. This approach is particularly effective for removing interference that is cyclostationary, for example in applications where ADSL signal occupies a binder with other ADSL signals.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing data received from a communications channel comprising the computer-implemented steps of:

receiving, from the communications channel, received data that is based upon both modulated data and distortion introduced by the communications channel, wherein the modulated data is the result of original data modulated onto one or more carriers;

generating sampled data by sampling the received data at a specified rate that satisfies specified sampling criteria;

generating a filtered observation sequence by processing the sampled data;

generating an observation vector from the filtered observation sequence;

generating estimated modulated data by processing the observation vector using a recursive filter; and recovering an estimate of the original data by demodulating the estimated modulated data.

2. The method as recited in claim 1, wherein:

the specified sampling criteria includes a specified rate equal to or greater than twice a rate at which the original data was modulated onto the one or more carriers, and the step of generating sampled data by sampling the received data at a specified rate that satisfies specified sampling criteria includes sampling the received data at the specified rate equal to or greater than a multiple of twice a twice the rate at which the original data was modulated onto the one or more carriers.

3. The method as recited in claim 1, wherein the step of generating a filtered observation sequence by processing the sampled data includes generating the filtered observation sequence by processing the sampled data using a finite impulse response (FIR) filter.

4. The method as recited in claim 3, wherein a set of one or more coefficients for the FIR filter are selected to minimize an overall impulse response of the communications channel and the FIR filter.

5. The method as recited in claim 1, wherein the communications channel is a twisted pair telephone line.

6. A method for processing data received from a communications channel comprising the computer-implemented steps of:
   receiving, from the communications channel, received data that is based upon both modulated data and distortion introduced by the communications channel, wherein the modulated data is the result of original data modulated onto one or more carriers;
   generating sampled data by sampling the received data at a specified rate that satisfies specified sampling criteria;
   generating a filtered observation sequence by processing the sampled data;
   generating estimated modulated data by processing the filtered observation sequence using a recursive filter that at least approximates a steady state Kalman filter with an increased length state; and
   recovering an estimate of the original data by demodulating the estimated modulated data.

7. An apparatus for processing data received from a communications channel comprising:
   an analog-to-digital converter configured to generate sampled data by sampling, at a specified rate that satisfies specified sampling criteria, received data received from the communications channel, wherein the received data is based upon both modulated data and distortion introduced by the communications channel, and wherein the modulated data is the result of original data modulated onto one or more carriers;
   a first filter mechanism configured to generate a filtered observation sequence by processing the sampled data;
   an observation vector generator configured to generate an observation vector from the filtered observation sequence;
   a second filter mechanism configured to generate estimated modulated data by processing the observation vector; and
   a demodulator configured to recover an estimate of the original data by demodulating the estimated modulated data.

8. The apparatus as recited in claim 7, wherein:
   the specified sampling criteria includes a specified rate equal to or greater than twice a rate at which the original data was modulated onto the one or more carriers, and
   the analog-to-digital converter is further configured to sample the received data at the specified rate equal to or greater than twice the rate at which the original data was modulated onto the one or more carriers.

9. The apparatus as recited in claim 7, wherein the first filter mechanism is a finite impulse response (FIR) filter.

10. The apparatus as recited in claim 9, further comprising an FIR coefficient estimator configured to estimate a set of one or more coefficients for the FIR filter such that an overall impulse response of the communications channel and the FIR filter is minimized.

11. The apparatus as recited in claim 7, wherein the communications channel is a twisted pair telephone line.

12. An apparatus for processing data received from a communications channel comprising:
   an analog-to-digital converter configured to generate sampled data by sampling, at a specified rate that satisfies specified sampling criteria, received data received from the communications channel, wherein the received data is based upon both modulated data and distortion introduced by the communications channel, and wherein the modulated data is the result of original data modulated onto one or more carriers;
   a first filter mechanism configured to generate a filtered observation sequence by processing the sampled data;
   a second filter mechanism that is configured to at least approximate a steady state Kalman filter with an increased length state and is also configured to generate estimated modulated data by processing the filtered observation sequence; and
   a demodulator configured to recover an estimate of the original data by demodulating the estimated modulated data.

13. A computer-readable medium carrying one or more sequences of one or more instructions for processing data received from a communications channel, wherein the processing of the one or more sequences of one or more instructions by one or more processors cause the one or more processors to perform the steps of:
   receiving, from the communications channel, received data that is based upon both modulated data and distortion introduced by the communications channel, wherein the modulated data is the result of original data modulated onto one or more carriers;
   generating sampled data by sampling the received data at a specified rate that satisfies specified sampling criteria;
   generating a filtered observation sequence by processing the sampled data;
   generating an observation vector from the filtered observation sequence;
   generating estimated modulated data by processing the observation vector using a recursive filter; and
   recovering an estimate of the original data by demodulating the estimated modulated data.

14. The computer-readable medium as recited in claim 13, wherein:
   the specified sampling criteria includes a specified rate equal to or greater than twice a rate at which the original data was modulated onto the one or more carriers, and
   the step of generating sampled data by sampling the received data at a specified rate that satisfies specified sampling criteria includes sampling the received data at the specified rate equal to or greater than twice the rate at which the original data was modulated onto the one or more carriers.

15. The computer-readable medium as recited in claim 13, wherein the step of generating a filtered observation sequence by processing the sampled data includes generating the filtered observation sequence by processing the sampled data using a finite impulse response (FIR) filter.

16. The computer-readable medium as recited in claim 15, wherein a set of one or more coefficients for the FIR filter are selected to minimize an overall impulse response of the communications channel and the FIR filter.

17. The computer-readable medium as recited in claim 13, wherein the communications channel is a twisted pair telephone line.

18. A method for processing data received from a communications channel comprising the computer-implemented steps of:

receiving, from the communications channel, received data that is based upon both modulated data and distortion introduced by the communications channel, wherein the modulated data is the result of original data modulated onto one or more carriers;

generating sampled data by sampling the received data at a specified rate that satisfies specified sampling criteria;

generating a filtered observation sequence by processing the sampled data;

generating estimated modulated data by processing the observation vector using a recursive filter that at least approximates a steady state Kalman filter with an increased length state; and recovering an estimate of the original data by demodulating the estimated modulated data.

* * * * *